United States Patent [19]
Suzuki et al.

[11] Patent Number: 5,965,479
[45] Date of Patent: Oct. 12, 1999

[54] ACTIVATED CARBON AND PROCESS FOR PRODUCING THE SAME

[75] Inventors: Mitsuo Suzuki; Hiroyuki Aikyo; Satoshi Hirahara; Kazushi Matsuura; Kohei Okuyama, all of Yokohama, Japan

[73] Assignee: Mitsubishi Chemical Corporation, Japan

[21] Appl. No.: 08/904,837

[22] Filed: Aug. 1, 1997

Related U.S. Application Data

[63] Continuation-in-part of application No. 08/595,586, Feb. 1, 1996, abandoned.

[30] Foreign Application Priority Data

| Feb. 3, 1995 | [JP] | Japan | 7-37758 |
| Jun. 30, 1995 | [JP] | Japan | 7-187954 |
| Aug. 30, 1995 | [JP] | Japan | 7-221965 |

[51] Int. Cl.$^6$ ............... B01J 21/18; B01J 20/02; D01F 9/12
[52] U.S. Cl. ............ 502/182; 502/416; 502/417; 502/423; 423/447.5
[58] Field of Search .............. 502/182, 416, 502/417, 423; 423/447.5

[56] References Cited

U.S. PATENT DOCUMENTS

| 2,354,713 | 8/1944 | Stoneman | 502/416 |
| 2,890,969 | 6/1959 | Schossberger et al. | 117/36 |
| 3,746,655 | 7/1973 | Urbanic | 502/416 |
| 4,141,959 | 2/1979 | Kato et al. | 502/517 |
| 4,532,115 | 7/1985 | Nishino et al. | 502/417 |
| 4,734,273 | 3/1988 | Haskell | 502/416 |
| 4,840,762 | 6/1989 | Sawaki et al. | 423/447.5 |
| 4,921,831 | 5/1990 | Nakai et al. | 502/416 |
| 4,988,569 | 1/1991 | Okazaki et al. | 502/416 |

OTHER PUBLICATIONS

Patent Abstracts of Japan vol. 95, No. 2, Mar. 1995 & JP-A-06 315614 (Agency of Ind Science & Technol 111/94.
Data base WPI Week 8941 Derwent AN 89–296636 XP002000369 & JP-A-01 218 622 Agency of Ind Sci Tech Aug. 1989.
Database WPI Week 9123 Derwent AN 91–167055 XP002000370 & JP-A-03 098 613 Apr. 1991.
Database WPI Week 8022 Derwent AN 80–38885c XP002000371 & JP-A-55 051 436 (Kureha Chem Ind KK) Apr. 1980.
Zeltner, et al. "Supported Titania for Photodegradation." (month and year not available).

*Primary Examiner*—Mark L. Bell
*Assistant Examiner*—Patricia L. Hailey
*Attorney, Agent, or Firm*—Nixon & Vanderhye

[57] ABSTRACT

The present invention relates to an activated carbon comprising an activated carbon particle and titanium dioxide fine particles present at least on the surface thereof, which activated carbon contains substantially no carbon precursor on the surface thereof and has the lightness L value thereof of not more than 50.

14 Claims, 10 Drawing Sheets

ACTIVATED CARBON AND PROCESS FOR PRODUCING THE SAME

CROSS REFERENCE TO RELATED APPLICATION

This is a continuation-in-part application of Ser. No. 08/595,586, filed Feb. 1, 1996, now abandoned.

BACKGROUND OF THE INVENTION

The present invention relates to an activated carbon and a process for producing the same.

The activated carbon of the present invention is very excellent in terms of fixation of titanium dioxide to the activated carbon particle surfaces, and thus is an activated carbon in which titanium dioxide fine particles exist on and/or in an activated carbon particle surface without plugging up pores in the activated carbon particle. Also, the activated carbon of the present invention can drastically enhance the removing efficiency of harmful substances in water or gas under application of ultraviolet rays or the sunlight, so that it can be advantageously used for the purification treatment of service water, sewage, exhaust gas, etc., removal of malodor, and other purposes.

Generally, an activated carbon has an excellent absorptivity owing to the large specific surface area thereof and is popularly used for adsorption removal of the harmful substances in water or gas.

Recently, pollution of water, sea and atmospheric air by domestic and industrial wastes is spreading on the global scale. Eutrophication of lakes and rivers by domestic waste water including synthetic detergents and such, contamination of ground water or water supply sources by the organic solvents used in the semiconductor manufacturing plants or laundries, and pollution of water by efflux of agricultural chemicals used in the golf courses, etc., are the typical examples of exigent pollution problems.

Presently, activated sludge process is most popularly employed for waste water treatment, but this process is subject to strict regulations in relation to a temperature, pH, gas atmosphere, toxicity, etc., since it uses microorganisms. This process is also at a disadvantage in that it is almost ineffective for decomposition removal of agricultural chemicals, organic solvents (including halides), surfactants and the like. For the treatment of the organic substances which are biologically hard to decompose, there are available several effective methods such as a chlorine treatment method, ozone treatment method, incineration method and activated carbon adsorption method. The chlorine treatment method involves the problem that it causes a problem of residual chlorine due to excess feed, and chlorine may be reacted with the organic substances contained in water to be treated to produce organic halides such as trihalomethanes, etc. which are known to have carcinogenecity.

Recently, the ozone treatment method comes into the spotlight as an advanced water purification treatment method at the water purification plants and other similar facilities, but this method also has the problem of high cost of equipment and operation. The incineration method is impractical for the treatment of dilute solutions. The activated carbon adsorption method is a very effective method, but this method is still unsatisfactory in its adsorption removability of organic halides and is not effective for all of harmful substances in water.

The activated carbon adsorption method is also useful for removal of harmful substances in gas such as atmospheric pollutants and malodorants. Generally, it is required that the adsorption technique designed to be applied to the pollutants in gas is effective to low-concentration gaseous substances in the presence of steam or carbon dioxide. An activated carbon is used for removing of various kinds of organic and inorganic compounds under such conditions. The activated carbon for use in a gaseous phase has a large specific surface area as well as a porous structure with small pore size, and the adsorptive affinity thereof for low-concentration gases is high. Also, because of the hydrophobic surface thereof, activated carbon is small in adsorptive affinity for steam and is capable of removing harmful gaseous substances or malodorants existing in the gas, especially organic compounds, at high efficiency. However, there are the kinds of gaseous substances for which the adsorptive affinity to the activated carbon is weak, and thus activated carbon is not almighty for adsorption removal of harmful substances.

On the other hand, ever since the utilization of energy of light for direct decomposition of water by semiconductor photoelectrodes composed of crystals of titanium dioxide (Honda-Fujishima effect) has been realized in 1969, many and enthusiastic studies have been made on photo-catalysts represented by titanium dioxide in technical fields as a potential means for converting energy of light into chemical energy. Such a reaction is called photocatalytic reaction which proceeds with the aid of light, that is, even if a catalyst is present in the reaction system, the reaction does not proceed without application of light. This photocatalytic reaction has close relation with the ordinary catalytic reactions and photochemical reactions, but on the other hand has distinct differences from these ordinary reactions. The driving force of the ordinary catalysts is heat, and the transferring rate from the reaction system to the production system is varied by the presence of a catalyst. Therefore, the role of the catalyst is to control the reaction rate till reaching the equilibrium state specified by a temperature, pressure and other conditions of the system concerned, and the reaction attainable is restricted to one which can proceed thermodynamically. On the other hand, in a photochemical reaction, light is absorbed into the reaction system to cause a change of electronic state and chemical bond of the reactants so that the reaction system is converted into the production one, and as a result, a reaction that can never be brought about by a thermal reaction such as an ordinary catalytic reaction, can be realized.

In the photocatalytic reaction, on the other hand, the catalyst which has been brought into an electroncially excited state on absorption of light, acts to the reaction system, thereby proceeding the reaction only on the catalyst surface. This electronically excited state of the catalyst, as in the case of photochemical reaction, corresponds to a non-equilibrium state in which the electron temperature alone arose excessively, and consequently the reaction can proceed even under a mild condition wherein the reaction is considered thermodynamically impossible. This testifies that there are the cases where the principle in the ordinary catalytic reactions that "catalyst does not change the equilibrium of a chemical reaction" does not hold true, and this fact is characteristic of photocatalytic reactions.

Generally, a photocatalytic reaction comprises (1) a photo-excitation step in which the semiconductor is excited on absorption of light to generate electron-hole pairs, (2) a charge separation and transfer step in which the generated electrons and holes are transferred to the surface by virtue of potential gradient in the semiconductor particles and diffusion thereof, and (3) a surface reaction step in which the holes and electrons which moved to the surface, cause electron transfer with the compound adsorbed on the catalyst to induce a redox reaction.

Several techniques utilizing the characteristics of an activated carbon and titanium dioxide have been proposed. For instance, Japanese Patent Application Laid-open (KOKAI) No. 6-315614 discloses a method for removing pollutants by use of a mixture of titanium dioxide and an activated carbon. With the methods disclosed in Japanese Patent Application Laid-open (KOKAI) No. 6-315614, however, since the activated carbon and titanium dioxide exist separately from each other, it is difficult to make use of the potency of titanium dioxide to the maximal degree. It is also difficult to use the conventional purifying apparatuses directly in the form as they are stand.

As the activated carbon in which titanium dioxide fine particles exist on and/or in an activated carbon particle surface, it is well known a white activated carbon disclosed in Japanese Patent Application Laid-open (KOKAI) No. 4-256436 and a colored-activated carbon disclosed in U.S. Pat. No. 3,746,655. However, the former white activated carbon is an activated carbon in which titanium dioxide is adhered on the surface thereof to obtain a white colored-activated carbon. Therefore, if the surface of the activated carbon is covered with titanium dioxide until the surface color becomes white, the adsorption ability of the activated carbon is remarkably decreased. The later colored-activated carbon is an activated carbon in which a binder resin containing any kind of pigment is applied and adhered. Since the surface of the colored-activated carbon is covered by the binder resin, the adsorption ability of the activated carbon is also remarkably decreased. Further, when the colored-activated carbon is utilize as the photo-catalyst of titanium dioxide, the titanium dioxide comes off the activated carbon by the decomposition of the binder resin. Still further, in both Japanese Patent Application Laid-open (KOKAI) No. 4-256436 and U.S. Pat. No. 3,746,655, there is no description of photo-catalyst action.

As result of the present inventors' studies for overcoming the above-mentioned problems, it has been found that (i) by pulverizing coal, granulating the pulverized coal, carbonizing and activating the granules, titanium dioxide being added to the coal before the activation thereof, or (ii) by finely pulverizing a carbonaceous material, mixing with a binder, granulating the resultant mixture, hardening and carbonizing the granules and then activating the carbonized substance, titanium dioxide being added to the carbonaceous material before the activation, (1) quite surprisingly $TiO_2$ can remain as anatase-type or rutile-type $TiO_2$ having a photocatalytic action without producing a by-product such as $Ti_nO_{2n-1}$, etc. even when $TiO_2$ is placed in a strongly reducing atmosphere of the carbonization and further even if a steam activation (in which $H_2$ is generated and carbon exists therearound) is conducted in the activation step; (2) titanium dioxide is fixed fast on and/or in the activated carbon particle surfaces without plugging up the pores thereof, and minimizes separation of titanium dioxide; (3) further, in this case, it is possible to select as the starting carbonaceous material from various materials including coconut shell, coke, charcoal and coal, and to freely control the shape of the produced activated carbon; and (4) the obtained activated carbon in which a pertinent amount of titanium dioxide is fixed on and/or in the surface of activated carbon particle, that is, a lightness L value (Hunter) is not more than 50, is remarkably improved in its ability to remove the harmful substances in water or gas under application of ultraviolet rays or the sunlight. The present invention has been attained on the basis of this finding.

SUMMARY OF THE INVENTION

In a first aspect of the present invention, there is provided an activated carbon comprising an activated carbon particle and titanium dioxide fine particles present on and in the surface thereof and having the lightness value L thereof of not more than 50.

In a second aspect of the present invention, there is provided An activated carbon comprising an activated carbon particle and titanium dioxide fine particles present at least on the surface thereof, which activated carbon contains substantially no carbon precursor on the surface thereof and has the lightness value L thereof of not more than 50.

In a third aspect of the present invention, there is provided a process for producing activated carbon carrying titanium dioxide at least on the surface thereof and having a lightness value L of not more than 50, which comprises the steps of pulverizing coal, granulating the pulverized coal, carbonizing and activating the granules, wherein titanium dioxide is added to the coal before activation thereof.

In a fourth aspect of the present invention, there is provided a process for producing activated carbon carrying titanium dioxide at least on the surface thereof and having a lightness L value of not more than 50, which comprises the steps of finely pulverizing the carbonaceous material, mixing with a binder, granulating the resultant mixture, carbonizing the granules and then activating carbonized substance, wherein titanium dioxide is added to the starting carbonaceous material before activation.

DETAILED DESCRIPTION OF THE INVENTION:

The feature of the present invention lies in titanium dioxide fine particles which are fixed at least on the activated carbon particle surface, wherein the lightness value L (Hunter) become not more than 50 (a quantitative index of titanium dioxide fine particles present at least on the activated carbon particle surface) and the activated carbon contains substantially no carbon precursor on the surface thereof, so as not to cause substantially any reduction of the adsorption removability of the harmful substances by the activated carbon itself, thereby imparting a photocatalytic activity to the activated carbon.

As the starting material in the present invention, there can be used any of the conventional carbonaceous materials for activated carbon, but from the industrial viewpoint it is advisable to select the material by giving considerations to easiness of activation, quality grade, cost, mass and stable availability and others. The producing conditions and the price, and use of the product differ depending on the kind of the starting material used. The starting materials usable in the present invention are diversified, for instance, plant-based materials such as wood, sawdust, coconut shell and pulp waste; petrochemical fuel-based materials such as coal, petroleum heavy oil, and pyrolyzed coal and petroleum pitch; fibers spun-out from tar pitch; synthetic polymers resins such as phenol resin, furan resin, polyvinyl chloride resin and polyvinylidene chloride resin; plastic wastes; waste tires; and the like. These materials are carbonized and then activated to produce activated carbon particles. For activation of the material, usually gas activation method and chemicals activation method are used. The gas activation method is referred to as physical activation in contrast with the chemicals activation method. According to the gas activation method, the carbonized material is catalytically reacted with steam, carbon dioxide, oxygen or other oxidation gas at a high temperature to produce finely porous adsorbed carbon. Usually steam is used in industrial practice of the process.

In the chemicals activation method, the starting material is evenly impregnated with an activating chemicals and then heated in an inert gas atmosphere to produce finely porous adsorbed carbon through elimination and oxidation reactions with the chemicals. Examples of the chemicals usable for chemicals activation include zinc chloride, phosphoric acid, sodium phosphate, calcium chloride, potassium sulfide, potassium hydroxide, sodium hydroxide, potassium carbonate, sodium carbonate, sodium sulfate, potassium sulfate, calcium carbonate and the like. In the present invention, the method for producing the activated carbon is not specified, and those mentioned above can be used. The kind of the obtained activated carbon is diversified depending on the starting material and the production process used. The activated carbon obtained from any starting material or by any process can be used in the present invention. The shape of the activated carbon varies according to the purpose of use. For instance, crushed-shape, granulated-shape, granule-form, fiber-form, felt-form, fabric-form, sheet-form e or the like can be cited, and the activated carbon in any shapes can be used in the present invention.

Titanium dioxide fine particles present on or in the activated carbon particle surface in the present invention is an n-type semiconductor, and the band gap thereof is 3.0 eV in the rutile-type and 3.2 eV in the anatase-type. Generally, it is said that the anatase-type has a higher photocatalytic activity and a greater oxidative force due to the band gap difference of 200 meV, but titanium dioxide used in the present invention may be either rutile-type or anatase-type, and the crystal form thereof is not specified. The average particle size of titanium dioxide fine particles present on or in the activated carbon particle surface is preferably not more than 10 $\mu$m, more preferably 10 nm to 1 $\mu$m. As for the method of producing titanium dioxide, it is possible to use any known method such as sulfuric acid process or chlorine process as far as the produced titanium dioxide has a desired photocatalytic activity. Regarding the excitation light, there can be used any type of light if it contains ultraviolet ray with a wavelength of not more than 400 nm. The sunlight is also useful for the purpose of the present invention, not specifying to an ultraviolet lamp.

The average size of the activated carbon of the present invention is not less than 1 $\mu$m, preferably 10 $\mu$m to 3 cm.

The concentration of harmful substances in water or gas rise up in the neighborhood of the surface of the activated carbon because of the adsorbing action of the activated carbon. Therefore, the adsorption removability of harmful substances in water or gas is significantly enhanced by use of the activated carbon carrying titanium dioxide fine particles on or in the surface thereof in the present invention.

In the present invention, such titanium dioxide fine particles is present on or in the activated carbon particle surface. Here, the expression "present on or in the activated carbon particle surface" means that titanium dioxide exists in a physically or chemically fixed state on or in the activated carbon particle surface. Especially, an activated carbon in which titanium dioxide fine particles are embedded in activated carbon particles so that a part of the titanium dioxide fine particle comes out to appear at the surface of the activated carbon particle is preferred.

The fixation method is not specified. For instance, titanium dioxide may be fixed by making use of surface potential or by using a binder such as sap, molasses, polyvinyl alcohol, Teflon, clay mineral, pitch, phenolic resin or the like. In case where the fixation of titanium dioxide is conducted by use of a binder, the carbonization is conducted after the fixation so that the carbon-precursor does not remain on and in the surface of the activated carbon. Also, titanium dioxide may be mixed in the raw material used for the production of the activated carbon. Sol/gel method and CVD method are also useful for the above purpose.

It is to be noted that in case where the activated carbon particle surface is covered with titanium dioxide to such an extent that the carbon surface whitens, the specific surface area is reduced because of plugging up pores of the activated carbon particles. Generally, the adsorpability of activated carbon depends substantially on specific surface area, so that if the specific surface area is reduced as a result of excess covering of the activated carbon particle surface with titanium dioxide, the adsorpability of activated carbon lowers accordingly. In view of the above, the amount of titanium dioxide fine particles allowed to exist on or in the activated carbon particle surface is such that the produced activated carbon will have a lightness value L (Hunter) of not more than 50, preferably not more than 40, more preferably not more than 30. The preferable lower limit of the lightness value L (Hunter) is 2. Since titanium dioxide is a white pigment, the apparent lightness L value (Hunter) of activated carbon varies depending on the amount of titanium dioxide fine particles present on or in the activated carbon surface. If the lightness value L (Hunter) is within the above range, the activated carbon is apparently black in color, the BET specific surface area thereof is not reduced greatly, for example, the reduction percentage of the BET specific surface area (calculated as weight of carbon which removes the weight of $TiO_2$) is not more than 30% and the pores of the activated carbon particle are not filled up with titanium dioxide, so that the adsorpability of the activated carbon is scarcely impaired. If titanium dioxide is allowed to exist in such an amount that the lightness value L (Hunter) of the activated carbon go beyond the above range, the adsorpability of the activated carbon drops greatly.

Measurement of the lightness value L (Hunter) was conducted using a spectrometric differential calorimeter by filling the activated carbon in a round glass cell under the optical conditions of 0° illumination and 45° detection.

The amount of titanium dioxide fine particles on or in the activated carbon particle surface differs considerably according to the size of the activated carbon particle, titanium dioxide particles and the distribution of titanium dioxide (whether it exists only on the surface or is uniformly distributed throuthout the particle), so that it is preferable that the amount of titanium dioxide is not indicated by wt % but defined by the L value (Hunter). The amount of titanium dioxide is usually not more than 50%, preferably 0.1 to 30% expressed in terms of solids after drying (wt %). The BET specific surface area (measured by using nitrogen) of the activated carbon carrying the titanium dioxide particles on the surface according to the present invention is not less than 100 $m^2/g$, preferably not less than 1000 $m^2/g$.

The following processes are recommended for producing the activated carbon of the present invention.

(1) A process comprises the steps of pulverizing coal, granulating the pulverized coal, carbonizing and activating the granules, wherein titanium dioxide is added to the coal before activation thereof (first process).

(2) A process comprises the steps of finely pulverizing the carbonaceous material, mixing with a binder, granulating the resultant mixture, carbonizing the granules and then activating carbonized substance, wherein titanium dioxide is added to the starting carbonaceous material before activation (second process).

By conducting the fixation of titanium dioxide before activation process, the specific surface area increased by the activation is not decreased by fixation of titanium dioxide. It is preferable that the fixation of titanium dioxide is conducted before the carbonization process. In this case, even though the carbon precursor such as a resin is used as the binder, the specific surface area is not decreased whereby the binder resin covers the surface of activated carbon. Further, it is more preferable that the fixation of titanium dioxide is conducted before the granulating process. By conducting the above process, titanium dioxide is uniformly dispersed in the produced activated carbon and it is expected that the activity of the activated carbon is not changed by wearing the activated carbon surface in use or splitting the activated carbon because the titanium dioxide particles which are present in the activated carbon are newly exposed.

By adopting these processes, titanium dioxide can be fixed fast to the activated carbon particles, and further titanium dioxide having a photocatalytic activity is allowed to stay on or in the surfaces of the activated carbon particles.

The coal used in the first process is not specified, and any kind of coal having the desired granulating properties, such as bituminous coal, brown coal, anthracite, lignite, grass peat, peat and the like, may be properly selected. If necessary, tar and/or pitch may be mixed to improve the granulating properties. Among them, bituminous coat having a caking property is preferred.

Regarding mixing of titanium dioxide with coal, titanium dioxide may be mixed either before or after pulverizing of coal, and the mixing method is not specified.

The weight ratio of activated carbon particle and titanium dioxide differs depending on the degree of activation. Titanium dioxide to be mixed with coal is used in an amount which won't affect the granulating properties of the coal, preferably not more than 20% by weight, more preferably not more than 10% by weight based on the coal.

The mixture of coal and titanium dioxide is granulated into a particle size for practical use. This granules are subjected to dry distillation by heating at about 600 to 900° C. to decompose and carbonize the carbonaceous organic substances, followed by heating in the presence of steam to conduct activation. The temperature for activation may be properly selected as far as it is higher than the temperature used for carbonization, and it is preferably selected from a range of 900 to 1,100° C.

In the second process, as a suitable material of the starting carbonaceous material, coconut shell coal, coke, charcoal or coal may be used. The starting carbonaceous material is pulverized to a particle size preferably not more than 100 $\mu$m, more preferably 0.01 to 75 $\mu$m. A binder and titanium dioxide are added to the pulverized carbonaceous material, mixed up with heating and then granulated by a suitable granulator such as pelletizer, compacter or injection press.

The binder used here is not specified, but it is preferably one which can be hardened at 150 to 300° C. in the air and carbonized at a temperature of not more than 900° C., preferably 500 to 900° C. Typical examples of such binder are coal tar, pitch, molasses, sap, starch, thermosetting resins and the like.

Titanium dioxide used in the present invention may be either rutile-type or anatase-type, and its crystal form is not defined. The particle size of titanium dioxide is also not specified as far as it does not constitute a hindrance in granulation, but usually it is preferably not more than 10 $\mu$m, preferably 5 nm to 1 $\mu$m.

Titanium dioxide to be mixed with the starting carbonaceous material is used in an amount which won't impair the granulating properties of the starting carbonaceous material, preferably not more than 40% by weight, more preferably not more than 30% by weight based on the pulverized carbonaceous material. The mixing ratio of the binder is preferably about 35 to 60% by weight based on the total weight of the pulverized carbonaceous material and titanium dioxide.

The granulated material is hardened, although depending on the infusibilization temperature of the binder used, at 150 to 300° C. in the air and then dry distilled by heating at around 600 to 900° C. to decompose and carbonize the carbonaceous organic substances. The resulting product is heated in the presence of steam, thereby conducting an activation. The temperature applied for activation may be freely selected as far as it is higher than the temperature used for carbonization, and it is preferably in a range of 900 to 1,100° C.

According to these processes of the present invention, titanium dioxide can be securely fixed to the activated carbon particles and also control of the particle shape is easy. Especially, in the first and second processes, since titanium dioxide is added to coal or carbonaceous material before granulation, pores are produced by activating the obtained granules without plugging up the pores in the activated carbon with titanium dioxide, so that it is possible to attain excellent adsorption removability and decomposition removability.

Further, there is no restrictions to the starting coal or carbonaceous material, and titanium dioxide having a photocatalytic activity can be easily and securely let exist on or in the activated carbon particle surfaces.

The activated carbon of the present invention can be used in the same way as the conventional activated carbons, and the method of use thereof in either fluidized bed or fixed bed is not specified. For use of the said activated carbon, the conventional apparatus can be used as they are, and there is no need of enlarging the size of the apparatus. Further, by using the activated carbon of the present invention under application of ultraviolet rays or the sunlight, the removability of the activated carbon to harmful substances in water or gas is drastically increased as compared with the adsorption removal operation by use of conventional activated carbon alone, since in the present invention the removability is multiplied by the photocatalytic reaction of titanium dioxide. The adsorption ability of activated carbon is defined as a factor in which the substance to be removed is adsorbed until attaining the equilibrium between the amount of substance to be removed in water or gas and the amount of adsorbed substance. In the activated carbon according to the present invention, since the adsorbed substance is decomposed by the catalysis action of titanium dioxide, the equilibrium concentration is lowered and it is possible to attain a more rapid and more excellent removability. It is especially notable that the activated carbon of the present invention can be effectively applied to the treatment of water or gas containing organic halides, malodorants or other substances which are hardly removable with the conventional activated carbon. Another salient advantage to the activated carbon of the present invention is that, in use thereof, the time till the regeneration of the activated carbon is elongated since the growth of algae on the surface of the activated carbon is discouraged and also titanium dioxide decomposes a part of the adsorbed substances on the activated carbon particle surface. This makes maintenance and management of the apparatus easier.

The shape of the activated carbon of the present invention can be properly selected according to the purpose of use. For instance, the activated carbon can be offered in a crushed-shape granulated-shape, fiber-form, felt-form, fabric-form, sheet-form or the like.

The activated carbon of the present invention can greatly promote removal of harmful substances in water, and gas and provides a great deal of industrial benefits. Also, the process of the present invention is capable of producing such activated carbon at high efficiency and with ease.

EXAMPLES

The present invention is described in more detail below with reference to the examples thereof, which examples however are merely intended to be illustrative and not to be construed as limiting the scope of the invention.

Example 1

Figure 1:
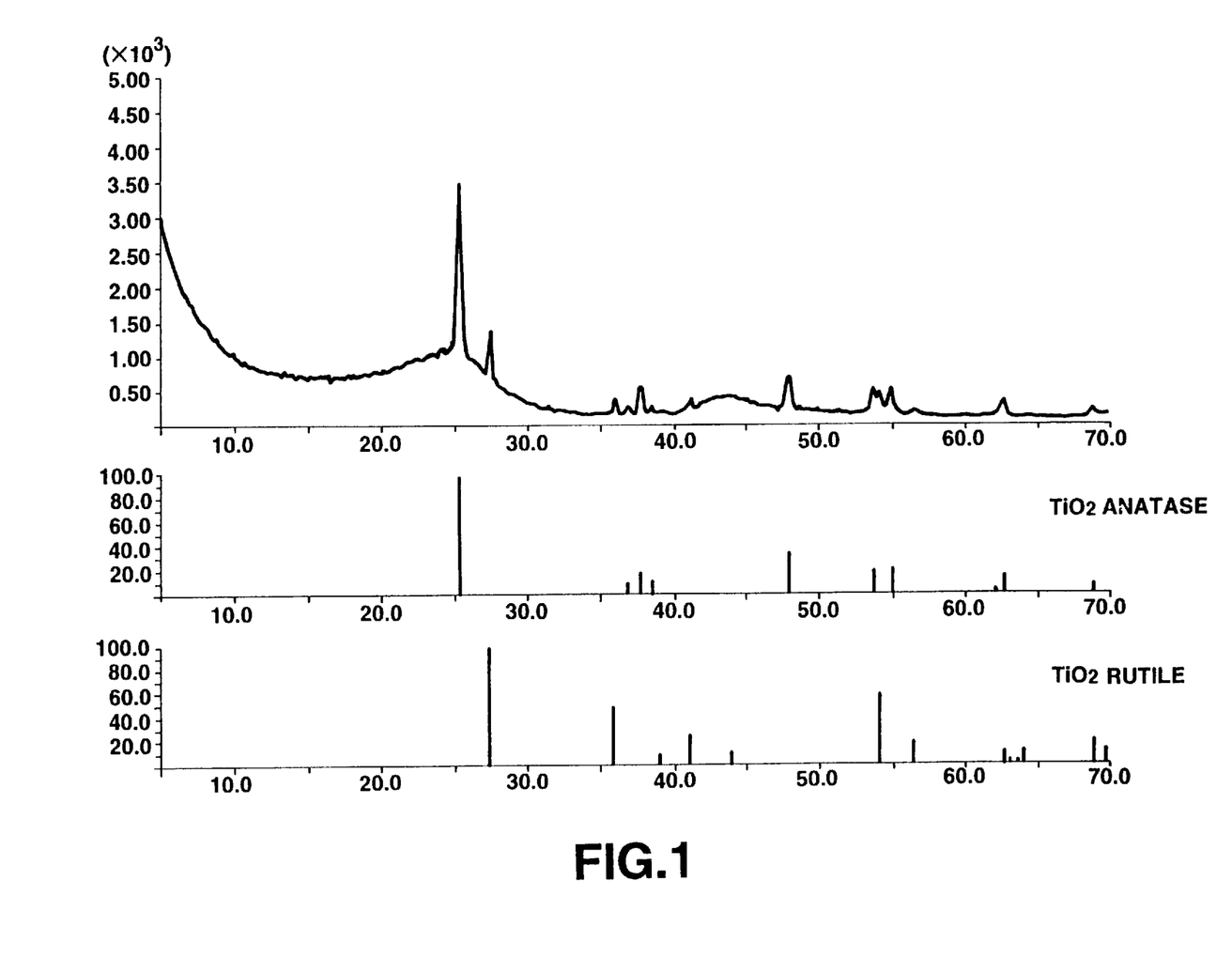
FIG. 1 is X-ray diffraction patterns of the activated carbon obtained in Example 1.
Figure 2:
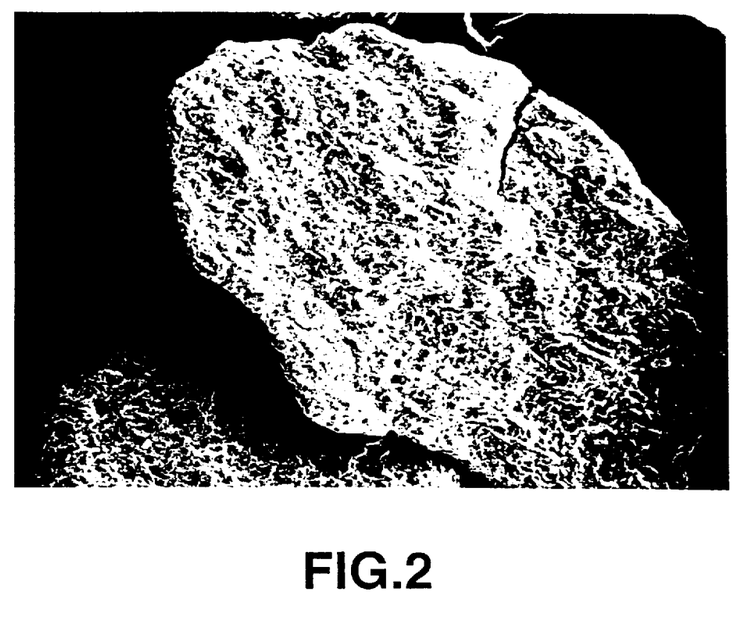
FIG. 2 is an Scanning Electron Micrograph (×80) showing the activated carbon obtained in Example 1.
Figure 3:
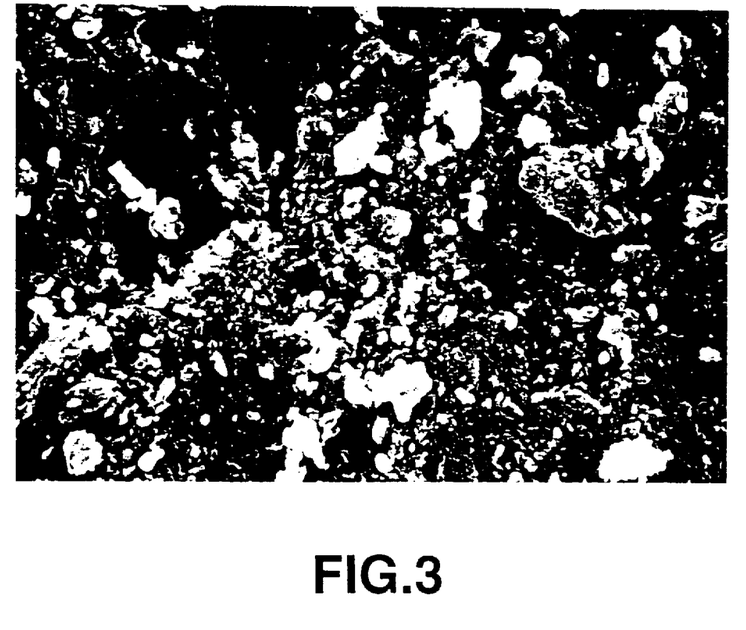
FIG. 3 is an Scanning Electron Micrograph (×10,000) showing the activated carbon obtained in Example 1.
Figure 4:
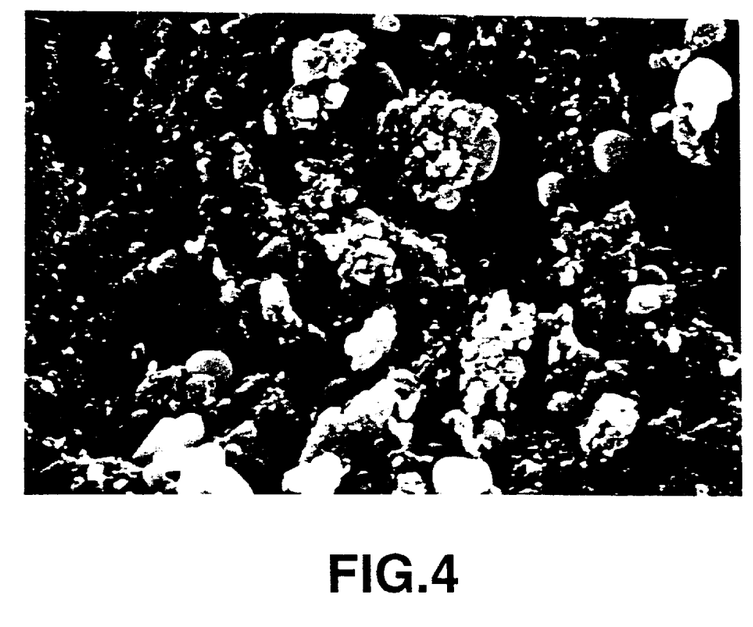
FIG. 4 is an Scanning Electron Micrograph (×30,000) showing the activated carbon obtained in Example 1.
Figure 5:
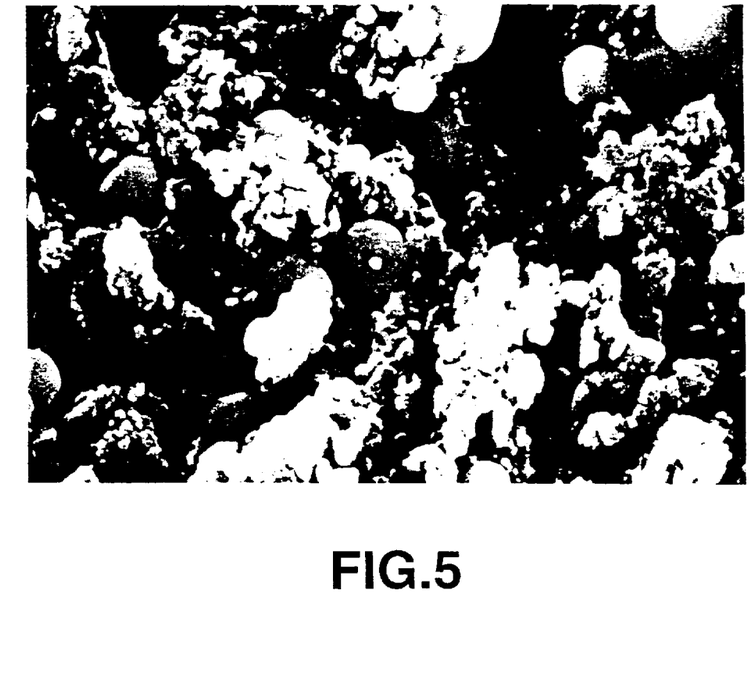
FIG. 5 is an Scanning Electron Micrograph (×50,000) showing the activated carbon obtained in Example 1.
Figure 6:
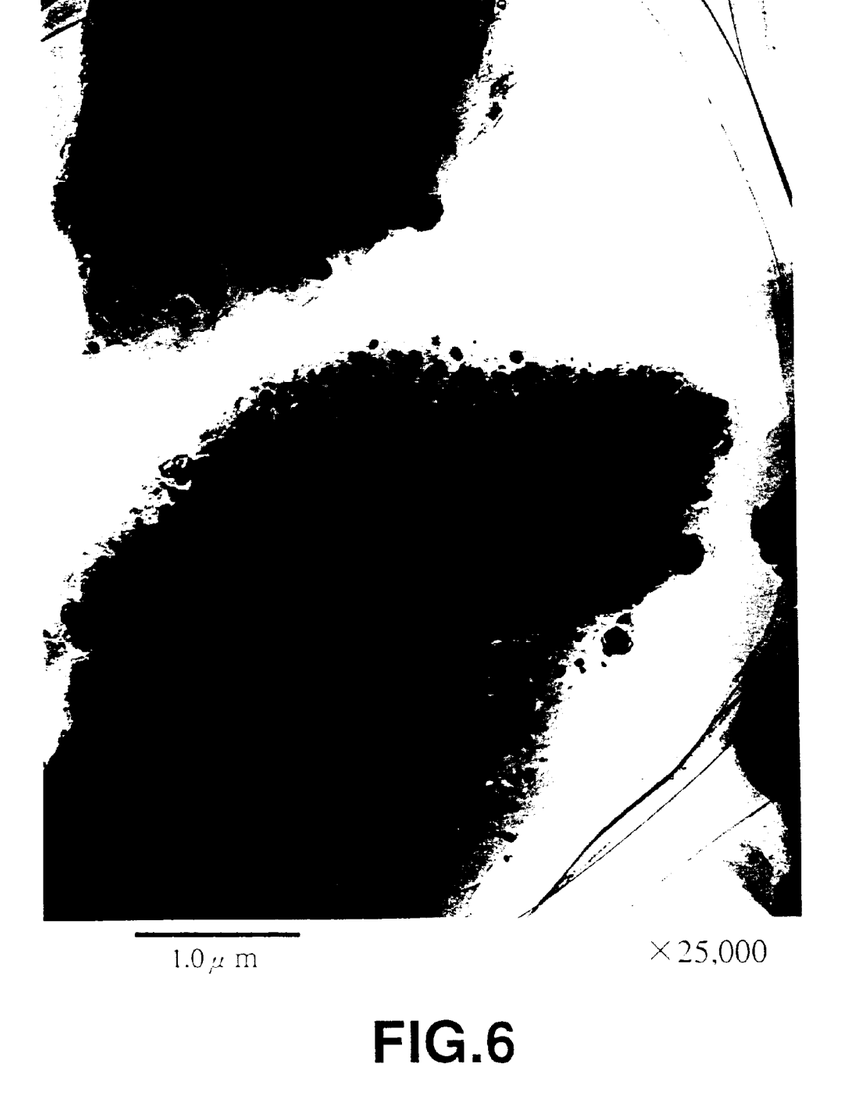
FIG. 6 is a Transmission Electron Micrograph (×25,000) showing the activated carbon obtained in Example 1.
Figure 7:
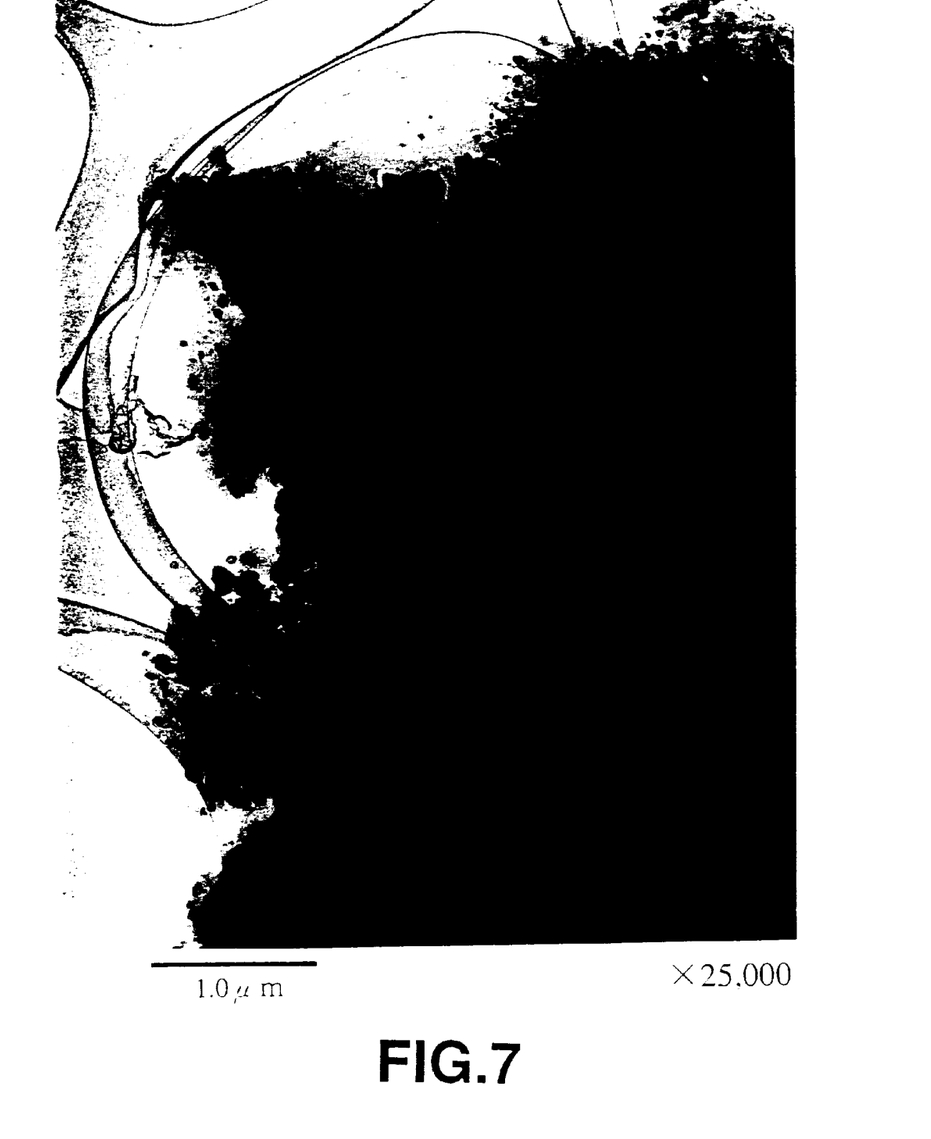
FIG. 7 is a Transmission Electron Micrograph (×25,000) showing the activated carbon obtained in Example 1.
Figure 8:
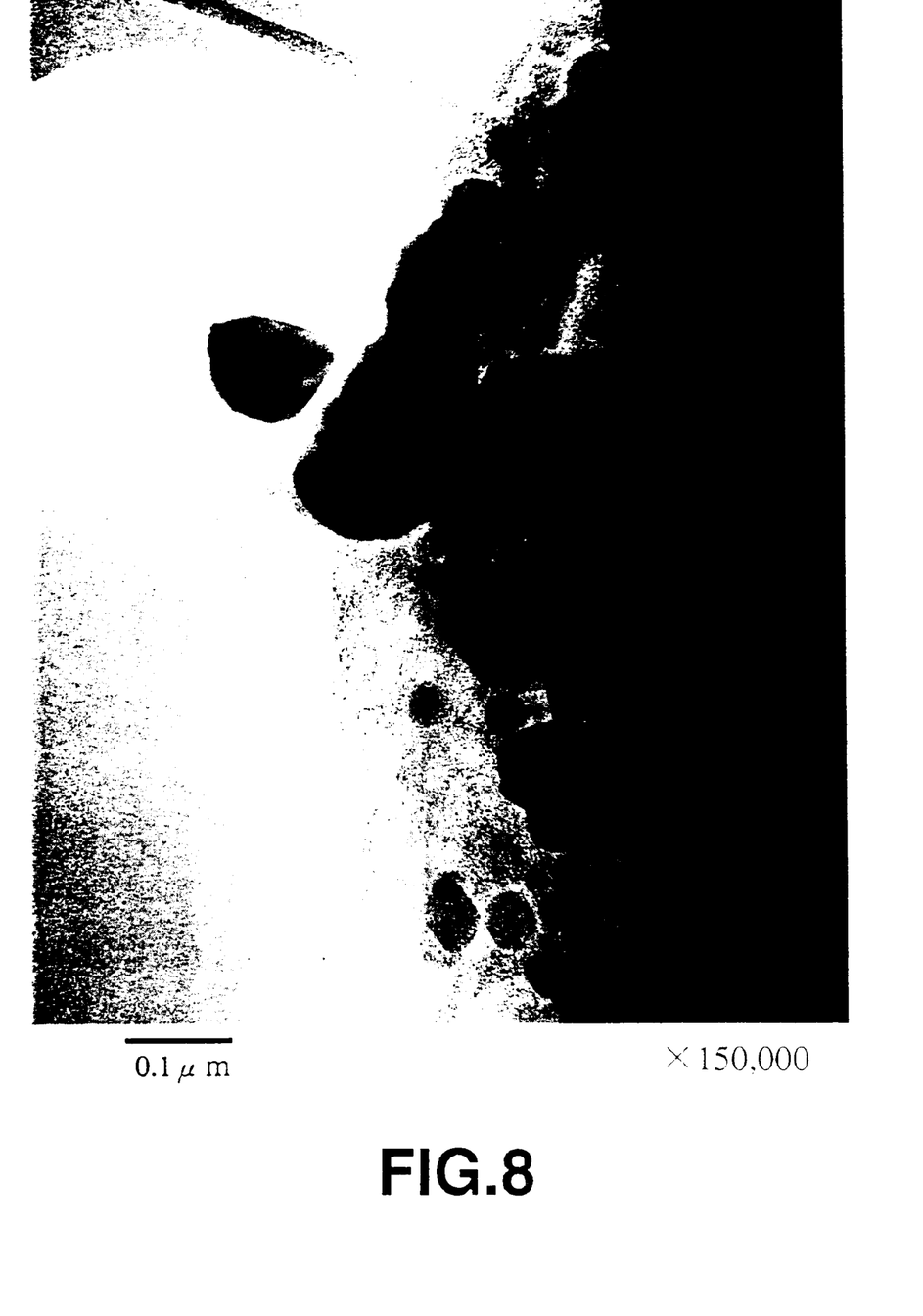
FIG. 8 is a Transmission Electron Micrograph (×150,000) showing the activated carbon obtained in Example 1.
Figure 9:
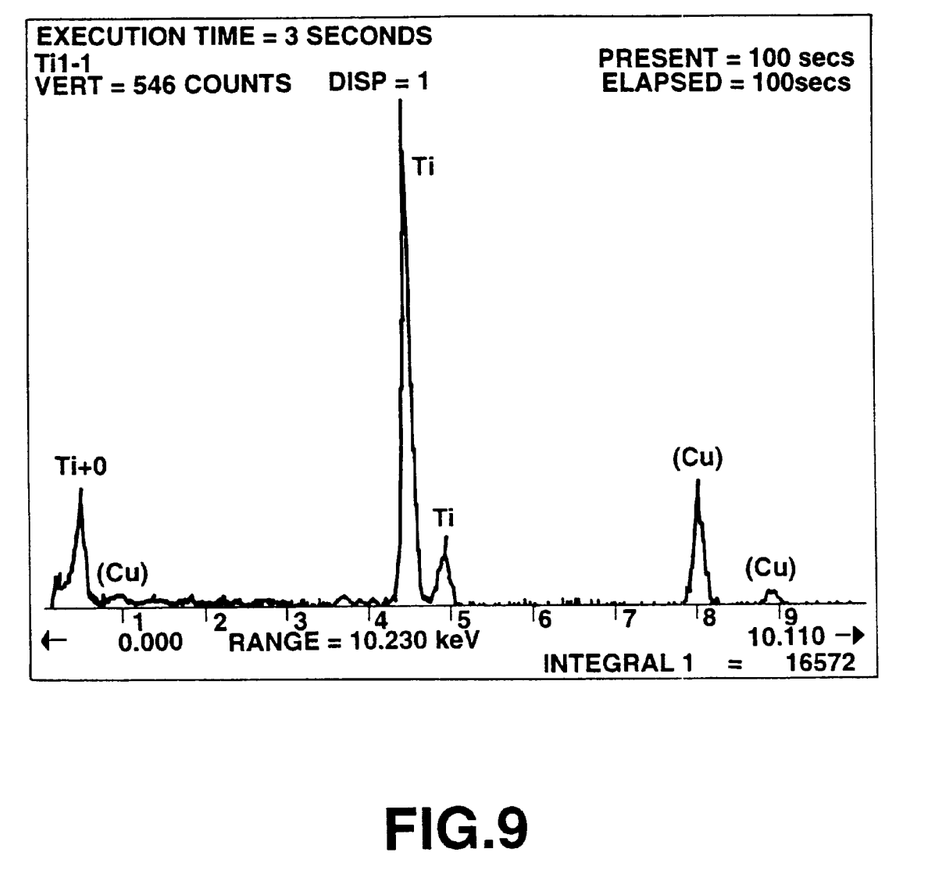
FIG. 9 is an EDX spectrum of the particle shown in the FIG. 8.

One kg of bituminous coal was pulverized to a size of about 1 mm, then mixed with 33 g of titanium dioxide (anatase-type, "MC-50", produced by Ishihara Sangyo Kaisha, LTD.) and further pulverized to a size of not more than 45 $\mu$m by a vibrating pulverizer. The pulverized coal mixed with titanium dioxide was granulated, followed by disintegrating to a size of about 0.6 to 1.2 mm, then carbonized in a 5 liter/min stream of $N_2$ at 750° C. and activated for 2 hours in a 900° C. kiln into which a nitrogen gas containing 50 vol % of steam has been introduced at a rate of 1 liter/min. The specific surface area of the resulting product measured by the BET method using a nitrogen adsorber "SORPTMATIC Series 1800" (mfd. by Carlo Erba Strumentazione) was 1,050 $m^2$/g. X-ray diffraction patterns (FIG. 1) showed the presence of only carbon and titanium dioxide (anatase and rutile), and no by-product was detected. As a quantitative index of titanium dioxide on the activated carbon particle surface, the light L value (Hunter) was measured with a spectrometric differential colorimeter "SZ-Σ90" (mfd. by Nippon Denshoku CO., LTD.) (0° illumination and 45° detection) by filling the activated carbon in a 30 mm$\phi$ round glass cell. The L value (Hunter) was 15. The solid concentration of titanium dioxide measured by ICP emission spectroscopic analysis was 8 wt %. In order to confirm the state of existence of titanium dioxide in the activated carbon particles, the obtained product was subjected to SEM observation (including EDX) and TEM observation (including EDX). The Scanning Electron Micrographs with different magnifications (×80, ∴10,000, ×30,000 and ×50,000) of the product are shown in FIGS. 2 to 5. The fine particles of several hundred nm were confirmed to be titanium dioxide from the X-ray spectrum of Ti by SEM-EDX (SEM: S-4500 of Hitachi, Ltd.; EDX: Delta System of Kevex Corp.). It is clearly seen that the pores of the activated carbon are not filled with titanium dioxide fine particles. This indicates that titanium dioxide exists only on the surface of the activated carbon particles, so that the activated carbon is not lowered in adsorptivity by the presence of titanium dioxide fine particles. Transmission Electron Micrographs of the product are shown in FIGS. 6–8 and an EDX spectrum (Hitachi H-9000NA and Kevex Delta System) is shown in FIG. 9, which show that titanium dioxide fine particles exists, in a fast fixed state, to the activated carbon particles with a particle size of several hundreds nm order.

0.1 g of the thus obtained activated carbon was put into an Erlenmeyer flask containing 130 ml of water with 17 ppm of chloroform and subjected to a chloroform removal test under irradiation with light from a 140 W ultraviolet lamp while stirring water in the flask. Two hours later, the chloroform concentration was measured by Headspace method. It has dropped to 7 ppm.

When the similar chloroform removal test was conducted without irradiation with light from the ultraviolet lamp, the chloroform concentration measured two hours later in the same way as described above was 10.5 ppm.

The above results attest to the better removing efficiency of the said activated carbon when used under irradiation with ultraviolet ray.

Example 2

90 g of coconut shell char was pulverized to a particle size of not more than 45 $\mu$m by a vibratory grinder and mixed with 10 g of titanium dioxide (anatase-type, "MC-50" produced by Ishihara Sangyo Kaisha, Ltd.). 45 g of pitch was added thereto as binder, followed by mixing under heating, and the resultant mixture was granulated into 1 mm$\phi$×3 mm columnar granules by Disk Pelletizer (mfd. by Fuji Powdall Co., Ltd.). The obtained granules were subjected to an infusibilization treatment in the air at 200° C. to harden. The hardened product was were then carbonized in a 5 liter/min $N_2$ stream at 750° C. and activated for 2 hours in a 1,000° C. kiln into which nitrogen gas containing 50 vol % of steam has been introduced. As a quantitative index of titanium dioxide on the activated carbon particle surface, the light value L (Hunter) was measured with a spectrometric differential calorimeter "SZ-Σ90" (mfd. by Nippon Denshoku CO., LTD.) (0° illumination and 45° detection) by filling the activated carbon in a 30 mm$\phi$ round glass cell. The L value (Hunter) was 16. The specific surface area of the product measured by BET method using a nitrogen adsorber (SORPTMATIC Series 1800, mfd. by Carlo Erba Strumentazione) was 1,130 m$^2$/g. X-ray diffraction patterns of the obtained sample showed the presence of only carbon and titanium dioxide (anatase-type and rutile-type), and no by-product was detected. The solid concentration of titanium dioxide as determined by ICP emission spectroscopic analysis was 7 wt %.

0.2 g of the thus obtained activated carbon was put into a quartz-made container containing 130 ml of water with 25 ppm of chloroform and subjected to a chloroform removal test under irradiation with light from a 140 W ultraviolet lamp while shaking the container by a 25° C. thermostatic shaker. Two hours later, the chloroform concentration was measured by Headspace method and found to have been reduced to 4.3 ppm.

When the same chloroform removal test was conducted without irradiation with light, the chloroform concentration two hours later in the same way as described above was 7.5 ppm.

The above results indicate that the activated carbon of the present invention, when used under irradiation with ultraviolet ray, can maintain its photocatalytic activity and shows an excellent removability.

Example 3

Figure 10:
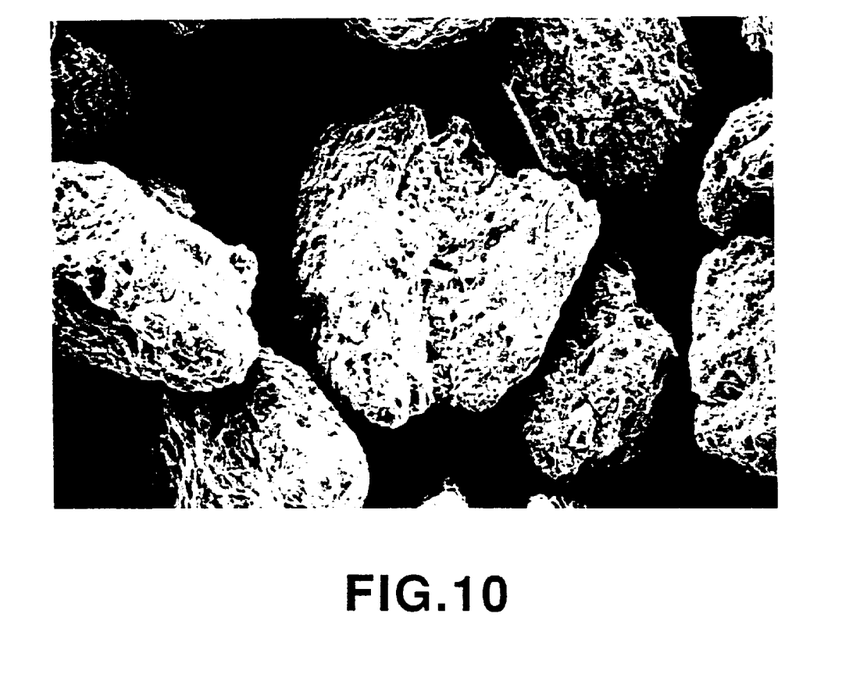
FIG. 10 is an Scanning Electron Micrograph (×60) of the activated carbon particles obtained in Example 3.
Figure 11:
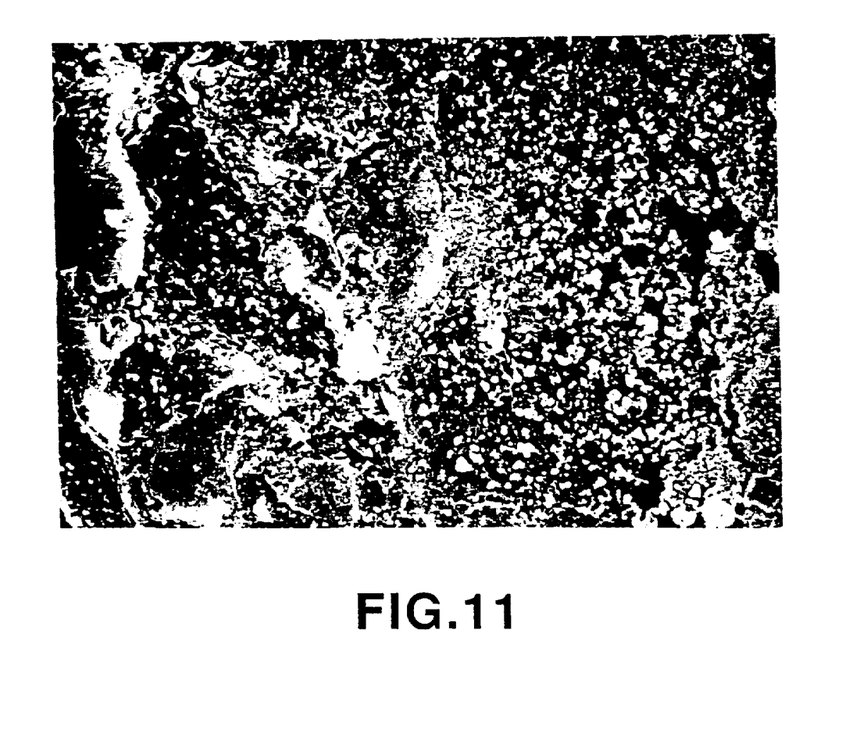
FIG. 11 is an Scanning Electron Micrograph (×1,500) of the activated carbon particles obtained in Example 3.
Figure 12:
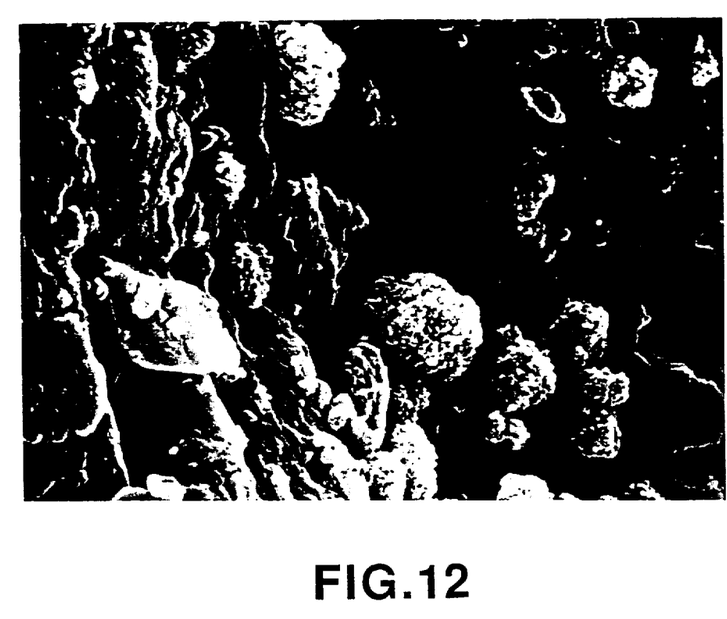
FIG. 12 is an Scanning Electron Micrograph (×20,000) of the activated carbon particles obtained in Example 3.
Figure 13:
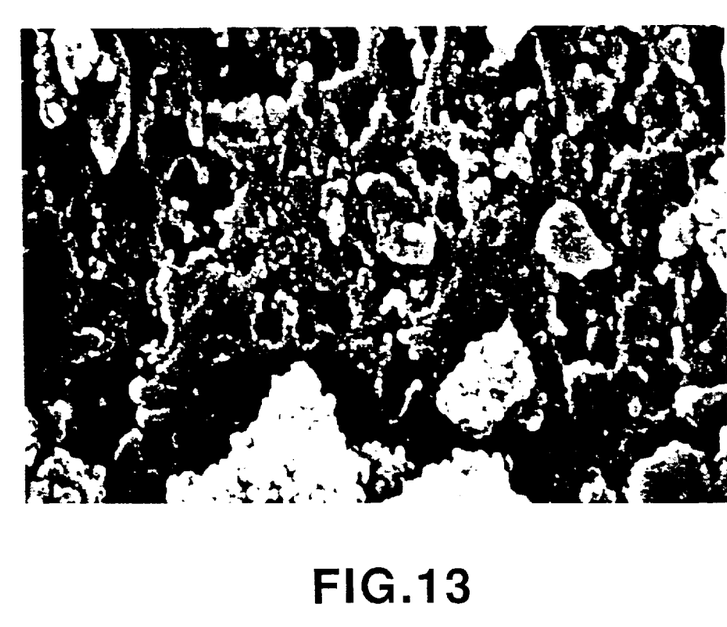
FIG. 13 is an Scanning Electron Micrograph (×50,000) of the activated carbon particles obtained in Example 3.

An aqueous slurry of titanium dioxide "MC-50" (anatase-type, average particle size: 24 μm, produced by Ishihara Sangyo Kaisha, Ltd.) was adjusted to pH 8 and mixed with activated carbon particles "008S" (particle size: 0.35 to 0.71 mm, produced by Mitsubishi Chemical corporation), causing titanium dioxide to be fixed on the activated carbon particle surface by the difference in surface potential. FIGS. 10 to 13 are the Scanning Electron Micrographs of the obtained activated carbon. FIG. 10 is a general view of the activated carbon particles. The small white particles in FIG. 11 are titanium dioxide fine particles. FIGS. 12 and 13 are the photographs showing that titanium dioxide exists as agglomerates of several hundred nm in particle size. It was confirmed that these white agglomerates of several hundred nm were the particles of titanium dioxide by SEM-EDX (SEM: Hitachi S-4100; EDX: Kevex Delta System) from the X-ray spectrum of Ti. It is clearly seen from FIG. 13 that the pores of the activated carbon particles are not filled up with titanium dioxide fine particles. This indicates that titanium dioxide fine particles exists on the activated carbon particle surfaces without lowering adsorptivity of the activated carbon particles. As a quantitative index of titanium dioxide on the activated carbon particle surface, the light value L (Hunter) was measured with a spectrometric differential colorimeter "SZ-Σ90" (mfd. by Nippon Denshoku CO., LTD.) (0° illumination and 45° detection) by filling the activated carbon in a 30 mmφ round glass cell. The L value (Hunter) was 19. The solid concentration of titanium dioxide determined by ICP emission spectroscopic analysis was 0.4 wt %.

Figure 14:
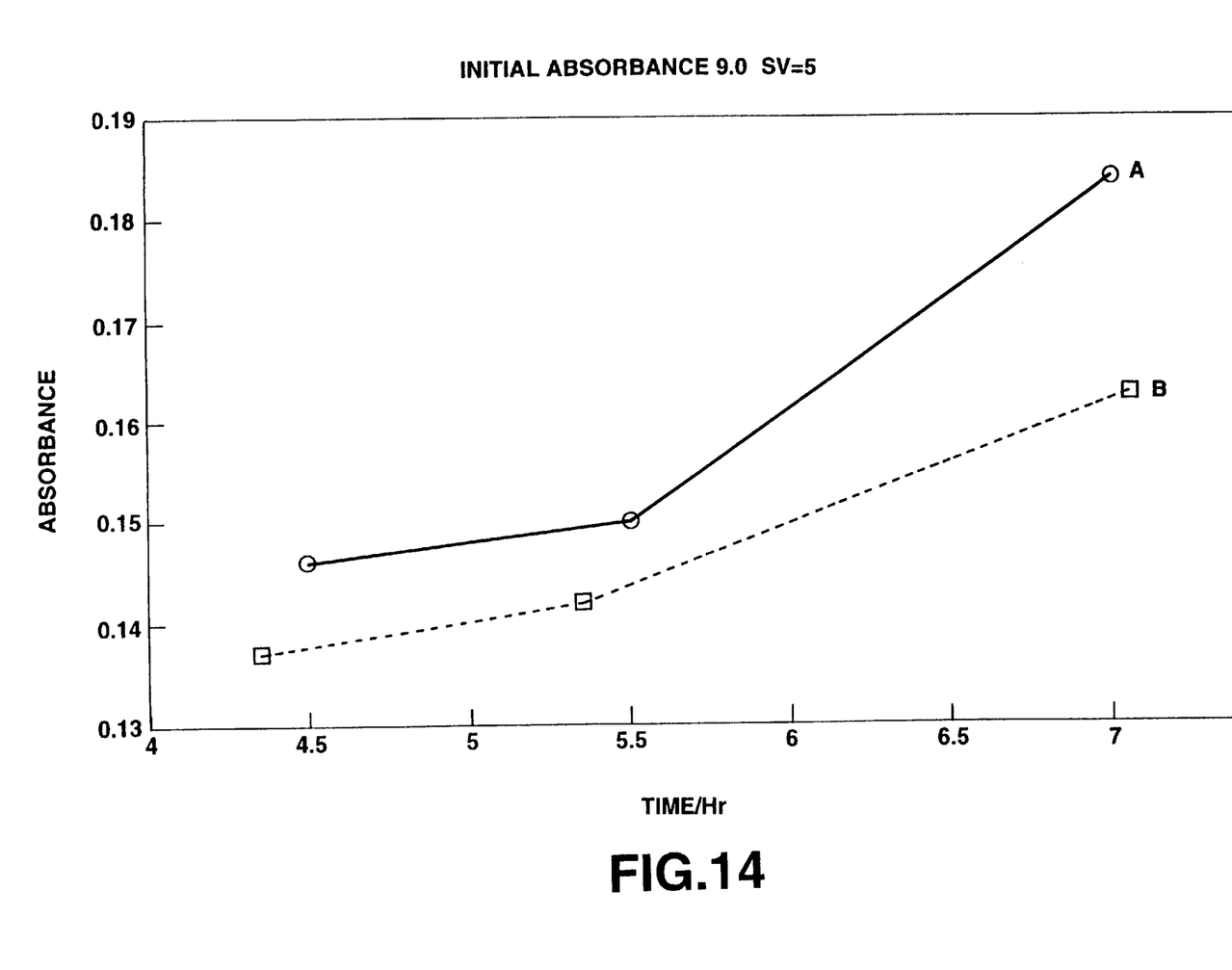
FIG. 14 is break through curves showing the relation between absorbance and water passing time, of the activated carbon obtained in Example 3 and Comparative Example 1.

Using the thus obtained activated carbon, a water column-passing test was conducted at SV=5 under irradiation with light from a 140 W ultraviolet lamp. In the test, a leaf mold extract whose absorbance of light of 260 nm was 9 in a quartz-made 5-cm cell (E260 [5 cm cell]=9), was passed through a quartz-made 5 mmφ column, and the humic substance removability was evaluated. In FIG. 14, B shows the obtained break through curve (which shows relation between absorbance and water passing time).

Comparative Example 1

Activated carbon was produced by the same procedure as in Example 3 except that no titanium dioxide was used, and the value L (Hunter) of the obtained activated carbon was measured in the same way as in Example 3. The value L (Hunter) was 16. In FIG. 14, A is the break through curve of the obtained activated carbon.

It is evident from the above that the activated carbon existing titanium dioxide on the surface has better contaminant removability than the activated carbon having no titanium dioxide.

What is claimed is:

1. An activated carbon consisting essentially of an activated carbon particle and titanium dioxide fine particles having an average particle size of not more than 10 μm present on and in the surface thereof and having the lightness value L thereof of not more than 30.

2. An activated carbon comprising an activated carbon particle and titanium dioxide fine particles having an average particle size of not more than 10 μm present at least on the surface thereof, which activated carbon contains substantially no carbon precursor on the surface thereof and has the lightness value L thereof of not more than 30.

3. An activated carbon according to claim 2, which further has a BET specific surface area of not less than 100 m$^2$/g.

4. An activated carbon according to claim 2, wherein the average particle size of the activated carbon is 1 μm to 3 cm.

5. A process for producing activated carbon carrying titanium dioxide having an average particle size of not more than 10 μm at least on the surface thereof and having a lightness value L of not more than 30, with process comprises the steps of pulverizing coal, granulating the pulverized coal, carbonizing and activating the granules, wherein titanium dioxide is added to the coal before activation thereof.

6. The process according to claim 5, wherein titanium dioxide is added to the coal before carbonizing.

7. The process according to claim 5, wherein titanium dioxide is added to the coal before granulating.

8. The process according to claim 5, wherein titanium dioxide is added to the coal after pulverizing.

9. The process according to claim 5, wherein titanium dioxide is added to the coal before pulverizing.

10. A process for producing activated carbon carrying titanium dioxide having an average particle size of not more than 10 μm at least on the surface thereof and having a lightness value L of not more than 30, which process comprises the steps of finely pulverizing the carbonaceous material, mixing with a binder, granulating the resultant mixture, carbonizing the granules and then activating carbonized substance, wherein titanium dioxide is added to the starting carbonaceous material before activation.

11. The process according to claim 10, wherein titanium dioxide is added to the coal before carbonizing.

12. The process according to claim 10, wherein titanium dioxide is added to the coal before granulating.

13. The process according to claim 10, wherein titanium dioxide is added to the coal after pulverizing.

14. The process according to claim 10, wherein titanium dioxide is added to the coal before pulverizing.

* * * * *